(12) United States Patent
Hartley

(10) Patent No.: US 7,808,068 B2
(45) Date of Patent: Oct. 5, 2010

(54) METHOD FOR SENSING INTEGRATED CIRCUIT TEMPERATURE INCLUDING ADJUSTABLE GAIN AND OFFSET

(75) Inventor: Paul Hartley, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 215 days.

(21) Appl. No.: 12/208,671

(22) Filed: Sep. 11, 2008

(65) Prior Publication Data

US 2009/0002062 A1 Jan. 1, 2009

Related U.S. Application Data

(62) Division of application No. 10/940,320, filed on Sep. 14, 2004, now Pat. No. 7,439,601.

(51) Int. Cl.
*H01L 31/058* (2006.01)
(52) U.S. Cl. .............. 257/467; 323/233; 323/313; 323/315; 327/512; 327/539; 327/541; 327/543
(58) Field of Classification Search ............. 257/467; 323/233, 313, 315; 327/512, 539, 541, 543
See application file for complete search history.

(56) References Cited

U.S. PATENT DOCUMENTS

| | | | |
|---|---|---|---|
| 5,339,018 A | 8/1994 | Brokaw | |
| 5,512,817 A | 4/1996 | Nagaraj | |
| 5,519,354 A | 5/1996 | Audy | |
| 5,804,955 A * | 9/1998 | Tuozzolo et al. | 323/277 |
| 6,028,472 A * | 2/2000 | Nagumo | 327/512 |
| 6,664,847 B1 | 12/2003 | Ye | |
| 6,816,351 B1 | 11/2004 | Frank et al. | |
| 7,157,893 B2 | 1/2007 | Lee | |
| 7,176,701 B2 * | 2/2007 | Wachi et al. | 324/721 |
| 7,211,993 B2 * | 5/2007 | Marinca | 323/316 |
| 2004/0075487 A1 | 4/2004 | Tesi | |
| 2006/0103455 A1 * | 5/2006 | Zhang et al. | 327/543 |
| 2007/0170906 A1 * | 7/2007 | Marinca | 323/316 |
| 2008/0018317 A1 * | 1/2008 | Chen et al. | 323/313 |
| 2008/0018482 A1 * | 1/2008 | Chiu et al. | 340/584 |

(Continued)

OTHER PUBLICATIONS

Pease, Robert A.; "A New Fahrenheit Temperature Sensor"; IEEE Journal of Solid-State Circuits; Dec. 1984; pp. 971-977; vol. SC-19, No. 6; USA.

(Continued)

*Primary Examiner*—Ngan Ngo

(57) ABSTRACT

Embodiments of the invention include a temperature sensor method for providing an output voltage response that is linear to the temperature of the integrated circuit to which the temperature sensor belongs and/or the integrated circuit die on which the temperature sensor resides. The output voltage of the temperature sensor has an adjustable gain component and an adjustable voltage offset component that both are adjustable independently based on circuit parameters. The inventive temperature sensor includes an offset circuit that diverts a portion of current from the scaled PTAT current before the current is sourced through the output resistor. The offset circuit includes a bandgap circuit arrangement, a voltage to current converter arrangement, and a current mirror arrangement that are configured to provide a voltage offset adjustable based on independent circuit parameters such as resistor value ratios and transistor device scaling ratios. The gain of the temperature sensor also is based on similar independent circuit parameters.

13 Claims, 5 Drawing Sheets

U.S. PATENT DOCUMENTS

2008/0111565 A1* 5/2008 Ausserlechner et al. ..... 324/727
2008/0180070 A1* 7/2008 Kushima et al. ............ 323/233
2009/0108917 A1* 4/2009 Chellappa ................... 327/539
2009/0110027 A1* 4/2009 Chellappa ................... 374/178
2009/0160537 A1* 6/2009 Marinca ..................... 327/539
2009/0189591 A1* 7/2009 Sperling et al. ............. 323/315

OTHER PUBLICATIONS

Meijer, Gerard C. M.; "An IC Temperature Transducer with an Intrinsic Reference"; IEEE Journal of Solid-State Circuits; Jun. 1980; pp. 370-373; vol. SC-15, No. 3; USA.

* cited by examiner

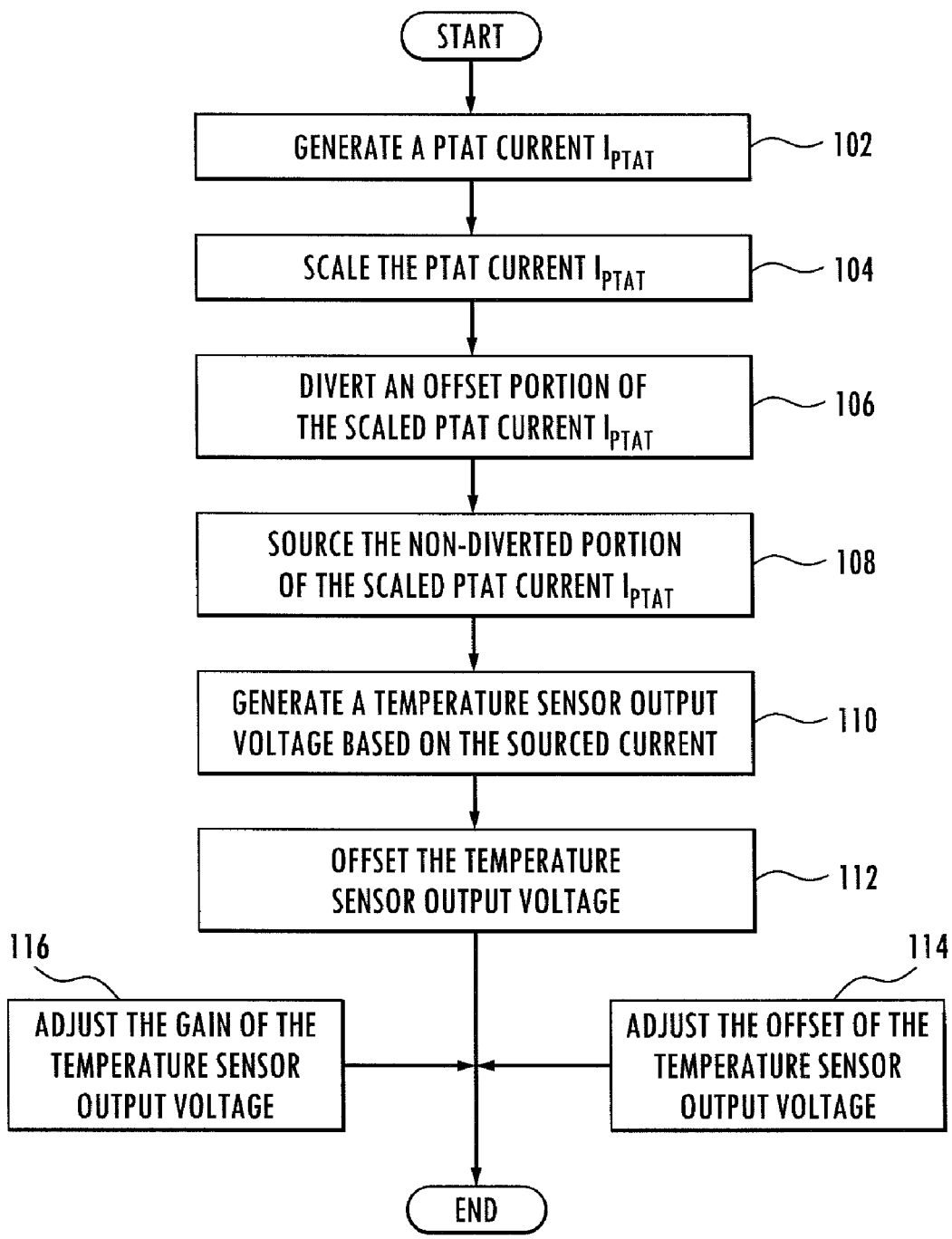

METHOD FOR SENSING INTEGRATED CIRCUIT TEMPERATURE INCLUDING ADJUSTABLE GAIN AND OFFSET

CROSS-REFERENCE TO RELATED APPLICATION

This application is a divisional of U.S. patent application Ser. No. 10/940,320 now U.S. Pat. No. 7,439,601, entitled "LINEAR INTEGRATED CIRCUIT TEMPERATURE SENSOR APPARATUS WITH ADJUSTABLE GAIN AND OFFSET," filed Sep. 14, 2004, which has been allowed.

BACKGROUND OF THE INVENTION

1. Field of the Invention

The invention relates to temperature sensors. More particularly, the invention relates to integrated circuit (IC) temperature sensors having linear response, adjustable gain and adjustable offset.

2. Description of the Related Art

Integrated circuit (IC) temperature sensors are used to determine the die or substrate temperature of an integrated circuit in which the temperature sensors are embedded. Since these temperature sensors are on the same die as the active circuitry whose temperature is to be measured, the temperature sensors can determine the junction temperature (the primary temperature of interest) of the active circuitry more accurately than, e.g., measuring the external IC package temperature. In general, it is known that the base-emitter voltage $V_{be}$ of a forward-biased transistor is a linear function of absolute temperature (T) in degrees Kelvin (° K), and is useful as the basis for a stable and relatively linear temperature sensor.

One such type of conventional temperature sensor typically involves a bandgap circuit that generates a current proportional to absolute temperature ($I_{PTAT}$), which, after being scaled by a current mirror or other suitable arrangement, is sourced through a temperature sensor resistor $R_{TS}$ to provide the output voltage $V_{OUT}$ of the temperature sensor. Since the temperature sensor resistor $R_{TS}$ is the same type of resistor as the resistor ($R_{PTAT}$) used in the bandgap circuit to generate $I_{PTAT}$, the output of the temperature sensor circuit is linearly proportional to temperature. Also, the gain (in volts/degrees Kelvin) of the temperature sensor, which is a function of the ratio of the temperature sensor resistor $R_{TS}$ to the bandgap circuit resistor $R_{PTAT}$, is adjustable. However, in this type of conventional temperature sensor, there is no voltage offset, i.e., the output voltage at 0° K (–273 degrees Celsius) is 0 volts.

Some other types of conventional temperature sensors offer both adjustable gain and adjustable offset. For example, see the temperature sensor disclosed in Pease, "A New Fahrenheit Temperature Sensor," IEEE Journal of Solid-State Circuits, Vol. SC-19, No. 6, December 1984, pages 971-977. However, the temperature sensor in Pease requires that the gain be calibrated by trimming the offset error at room temperature. That is, one or more resistors, e.g., the resistor $R_4$ and a resistor in the $I_{PTAT}$ current source circuit, must be trimmed to calibrate the gain.

Trimming, e.g., resistor trimming, is a conventional technique for calibrating sensor circuit performance. It involves, e.g., including a network of fusable links or buried fuses in the circuit to modify resistor values by blowing one or more of the fuses. Although trimming helps to compensate for component tolerances, manufacturing variations, and the effects of temperature and aging, trimming is relatively costly, time consuming in terms of extra test time for calibration, and requires additional process technology, e.g., process technology that supports trim links, fuses and other forms of one-time programmable devices.

Another conventional temperature sensor is disclosed by Audy in U.S. Pat. No. 5,529,354. The temperature sensor in Audy offers a less complex circuit design than the temperature sensor disclosed in Pease, and provides a programmable voltage offset for the temperature sensor. The programmable offset is provided by adding an offset resistor to a conventional band gap temperature cell and by generating the sensor output voltage at a different point in the circuit. However, to program the desired offset, Audy too requires trimming the offset resistor. Also, to program the gain of the temperature sensor, Audy requires trimming another resistor in the bandgap cell. As discussed hereinabove, resistor trimming is not an efficient calibration or offset adjustment technique.

Accordingly, it would be desirable to have an IC temperature sensor method that generates an output voltage that is linearly proportional to the IC die temperature and also allows for both the gain and the voltage offset to be adjusted independently by IC parameters, without trimming.

SUMMARY OF THE INVENTION

The invention is embodied in a temperature sensor method for providing an output voltage response that is linear to the temperature of the integrated circuit to which a temperature sensor belongs and/or the integrated circuit die on which the temperature sensor resides. Also, the output voltage of the temperature sensor has an adjustable gain component and an adjustable voltage offset component that both are adjustable independently based on circuit parameters. The temperature sensor includes a conventional bandgap circuit, which generates an internal PTAT (proportional to absolute temperature) current to produce a bandgap reference voltage, and a current mirror arrangement that provides a scaled current that is proportional to the bandgap circuit's PTAT current. Conventionally, the scaled PTAT current is sourced through an output resistor to provide the output voltage of the temperature sensor. According to embodiments of the invention, the temperature sensor also includes an offset circuit that diverts a portion of current from the scaled PTAT current before the current is sourced through the output resistor. In this manner, the inventive temperature sensor subtracts an offset voltage from the output voltage, which offset voltage represents the desired voltage offset component. The offset circuit includes a bandgap circuit arrangement, a voltage to current converter arrangement, and a current mirror arrangement that are configured to provide a voltage offset that is adjustable based on independent circuit parameters such as resistor value ratios and transistor device scaling ratios. The gain component of the inventive temperature sensor also is based on similar independent circuit parameter ratios. Thus, the temperature sensor is configured to provide an output voltage that is linearly dependent on temperature, and that has an adjustable gain and an adjustable offset that both are based on independent circuit design parameters.

BRIEF DESCRIPTION OF THE DRAWINGS

FIG. 6 is a block diagram of a method for sensing the temperature of an integrated circuit according to embodiments of the invention.

DETAILED DESCRIPTION OF EXEMPLARY EMBODIMENTS

Figure 1:
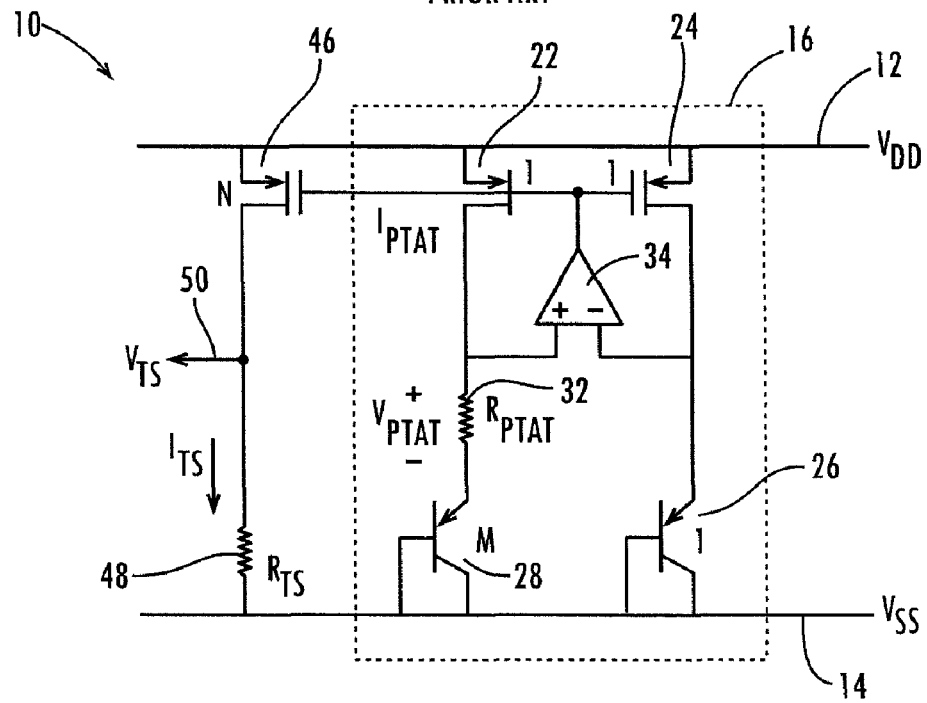
FIG. 1 is a simplified schematic diagram of a conventional integrated circuit (IC) temperature sensor.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a simplified schematic diagram of a conventional integrated circuit (IC) temperature sensor 10. As discussed previously herein, many conventional temperature sensors typically include some type of a bandgap circuit coupled between an upper supply voltage ($V_{DD}$) 12 and a lower supply voltage ($V_{SS}$) 14. In this particular conventional circuit arrangement, a portion of the bandgap circuit is shown generally as circuitry 16. The upper supply voltage $V_{DD}$ 12 is, e.g., 1.0 volts or 2.5 volts; the lower supply voltage $V_{SS}$ 14 is, e.g., ground potential.

The circuitry 16 includes several unit devices (i.e., scale is 1): two field effect transistor (FET) unit devices 22, 24 and a bipolar unit device 26. Also, the circuitry 16 includes an M-scaled bipolar device 28 (i.e., M bipolar unit devices connected in parallel), a resistor $R_{PTAT}$ 32 connected in series with the M-scaled device 28, and an operational amplifier (op-amp) 34 connected as shown between the two legs of the circuitry 16.

The op-amp 34 forces the voltage at $I_{TS}$ input terminals to be equal by controlling the gate voltage of the two FET unit devices 22 and 24, and hence the drain-source current through them. Since devices 22 and 24 both are of unit size, and share a common gate voltage, the drain-source current is the same in both devices. In this manner, the circuitry 16 generates a current proportional to absolute temperature (PTAT), shown as $I_{PTAT}$. Also, in this arrangement, the voltage across the resistor $R_{PTAT}$ 32, shown as $V_{PTAT}$, is equal to $\ln(M)*V_T$, where M is the scaling factor of the M-scaled bipolar device 28 and $V_T$, which is the thermal voltage of the M-scaled bipolar device, is a constant value equal to kT/q, where k is Boltzman's constant, T is the absolute temperature in degrees Kelvin (° K), and q is the electron charge (k/q=86.17 microvolts/° K). Based on these values, the current $I_{PTAT}$ through the resistor $R_{PTAT}$ 32 is equal to the voltage across the resistor ($V_{PTAT}$) divided by $I_{TS}$ resistance $R_{PTAT}$, i.e., $I_{PTAT}=V_{RPTAT}/R_{PTAT}$. Substituting for $V_{RPTAT}$, $I_{PTAT}$ is equal to $(\ln(M)*V_T)/R_{PTAT}$.

Figure 2:
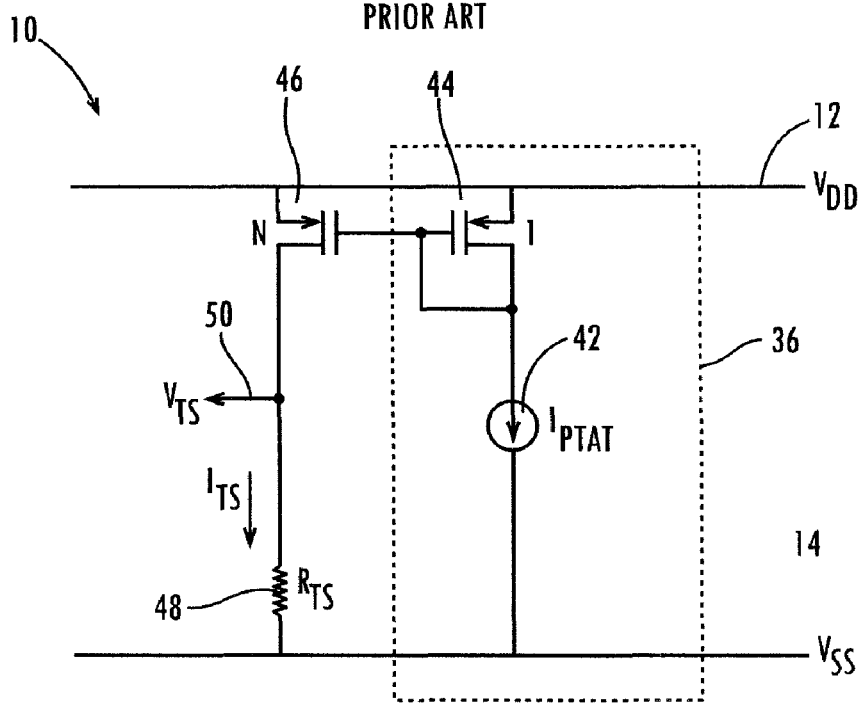
FIG. 2 is a simplified schematic diagram of an equivalent circuit for the conventional temperature sensor circuit shown in FIG. 1.

For purposes of clarity and simplicity in describing the operation of the conventional temperature sensor 10 shown in FIG. 1, at least a portion of the circuitry 16 can be represented by an equivalent circuit. Referring now to FIG. 2, with continuing reference to FIG. 1, shown is an equivalent circuit 36 to the circuitry 16 shown in FIG. 1. A portion of the equivalent circuit 36 is shown as an ideal current source 42 of value $I_{PTAT}$ and a field effect transistor (FET) device 44 coupled together between the upper supply voltage $V_{DD}$ 12 and the lower supply voltage $V_{SS}$ 14, as shown. The FET device 44, which is a metal oxide field effect transistor (MOSFET) or other suitable transistor device, is a unit device, i.e., the device has a scaling factor of 1.

The conventional temperature sensor 10 also includes an N-scaled FET device 46 (i.e., N FET devices coupled together in parallel) and a temperature sensor resistor $R_{TS}$ 48 coupled in series between the upper supply voltage $V_{DD}$ 12 and the lower supply voltage $V_{SS}$ 14. The voltage $V_{TS}$ (shown as 50) generated across the temperature sensor resistor $R_{TS}$ is the output voltage for the temperature sensor 10.

The current mirror or current mirror arrangement formed by the unit FET device 44 in the equivalent circuit 36 and the N-scaled device 46 keeps the ratio of the current $I_{TS}$ to $I_{PTAT}$ constant. The current $I_{TS}$ is scaled by a factor of N by the N-scaled device 46. That is, $I_{TS}=(N)(I_{PTAT})$. Also, the current source arrangement sources this N-scaled PTAT current through the temperature sensor resistor $R_{TS}$. Since, as discussed hereinabove, $I_{PTAT}=(\ln(M)*V_T)/R_{PTAT}$, by substituting for $I_{PTAT}$, $I_{TS}$ is equal to $(N)(\ln(M)*V_T)/R_{PTAT}$.

Therefore, the voltage $V_{TS}$ 50 across the resistor $R_{TS}$ 48, which voltage is the output of the temperature sensor 10, is equal to $R_{TS}*I_{TS}$, or substituting for $I_{TS}$, $V_{TS}=(R_{TS}/R_{PTAT})*N\ln(M)V_T$. Substituting kT/q for $V_T$ (e.g., as discussed hereinabove), $V_{TS}=(R_{TS}/R_{PTAT})*N\ln(M)(kT/q)$. Expressed another way, $V_{TS}=K_1 T$, where $K_1=(R_{TS}/R_{PTAT})(N\ln(M))(k/q)$. As shown by this equation, the output voltage $V_{TS}$ 50 of the temperature sensor 10 is dependent on temperature T, with $K_1$ being based on a number of constants and various component value ratios in the circuit of the temperature sensor 10.

Figure 3:
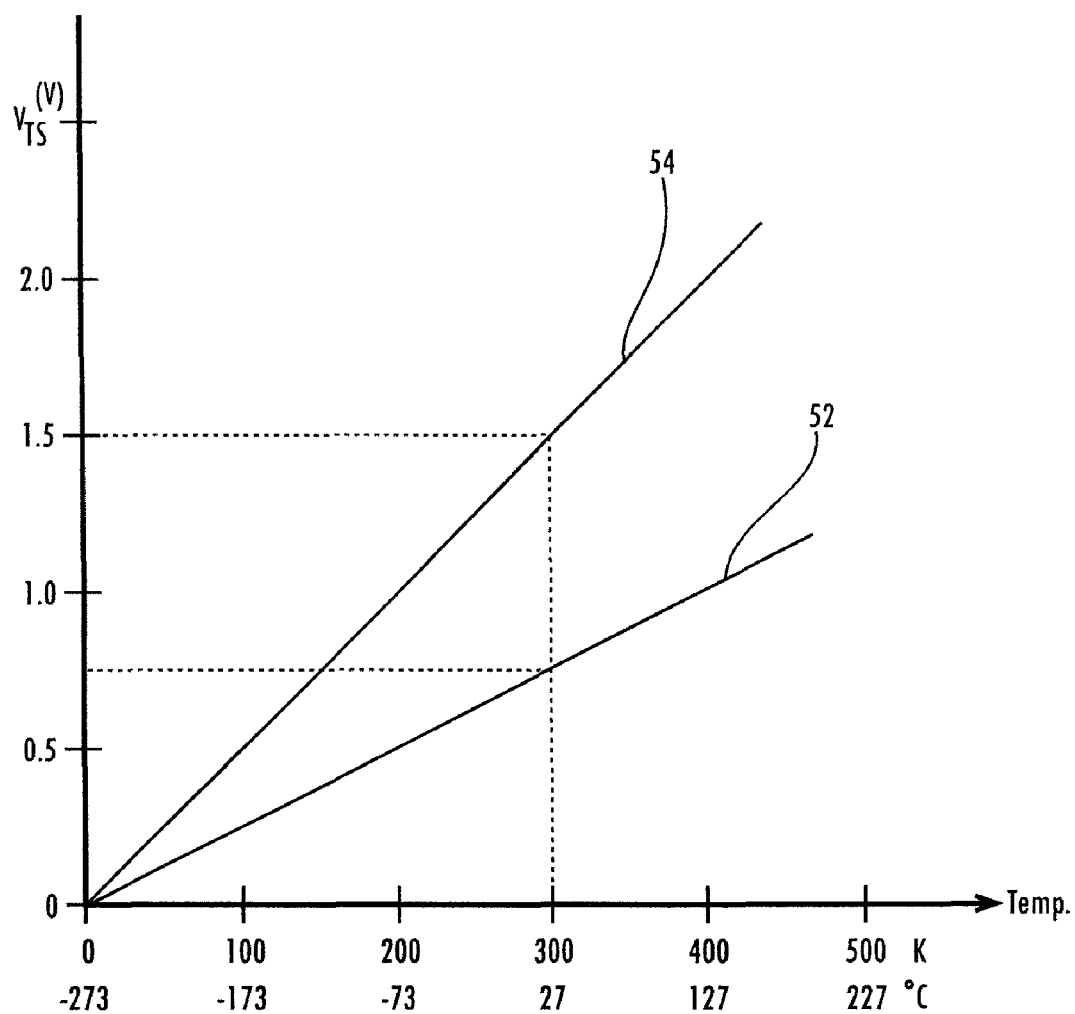
FIG. 3 is a graphical diagram of the output voltage of the conventional temperature sensor of FIG. 1, for various gain values (2 different gains), as a function of temperature.

Referring now to FIG. 3, shown is a graphical diagram of the output voltage $V_{TS}$ of the conventional temperature sensor 10, as a function of temperature. The output voltage $V_{TS}$ is shown for two different gain values of the temperature sensor 10. The gain is measured in volts per degrees Kelvin. As discussed previously hereinabove, the gain of the temperature sensor 10 is a function of the ratio of the temperature sensor resistor $R_{TS}$ 48 to the bandgap circuit resistor $R_{PTAT}$ 32, and therefore is adjustable.

The conventional temperature sensor 10 provides an output voltage that is proportional to temperature. Also, since the temperature sensor resistor $R_{TS}$ 48 is the same type of resistor as the resistor $R_{PTAT}$ 32 used in the circuitry 16, the output voltage $V_{TS}$ 50 of the conventional temperature sensor 10 is linearly proportional to temperature, as shown by the linearity of the output voltage plots.

However, as discussed previously herein, there is no voltage offset. That is, the output voltage at T=0 OK (−273° C.) is 0 volts, and it can not be adjusted. Therefore, for an operating region of interest, e.g., between 27 and 127 degrees Celsius (° C.), relatively large output voltages would be required by the temperature sensor 10, since all the plots of the output voltage $V_{TS}$ must pass through 0 for T=0 OK (i.e., −273° C.). But, with a typical voltage supply being in the range of, e.g., 1.0 to 2.5 volts, the output temperature swing is very limited across a typical operating temperature range of interest.

For example, for a 2.0 volt supply, the output voltage $V_{TS}$ of the temperature sensor 10 swings between a range of, e.g., 0.75 volts and 1.00 volts, for a first gain value (shown as plot 52), and a range of, e.g., 1.50 volts and 2.00 volts, for a second first gain value (shown as plot 54). Thus, the swing of the output voltage $V_{TS}$ varies from 0.25 volts to 0.50 volts across the useful operating temperature range, e.g., between 27° C. and 127° C. Such relatively small voltage swings offer relatively poor resolution for the temperature sensor 10. Furthermore, because the plots must always pass through 0 volts $V_{TS}$ for T=0° K, increasing the gain (i.e., increasing the slope of the plots 52 or 54) quickly moves $V_{TS}$ beyond the circuit supply voltage (e.g., 2.0 volts) for the entire operating temperature range of interest (e.g., 27° C. and 127° C.).

As just discussed, without a voltage offset, the conventional temperature sensor 10, while providing a linear response and having an adjustable gain, lacks the needed resolution or robustness. Ideally, for a 2.0 volt supply, the output temperature $V_{TS}$ should be between approximately 0 volts and approximately 2.0 volts (or approximately 2.5 volts for a 2.5 volt supply) across the operating temperature range of interest. Such response is possible with the proper circuit design parameters and both an adjustable gain and an adjustable voltage offset.

Figure 4:
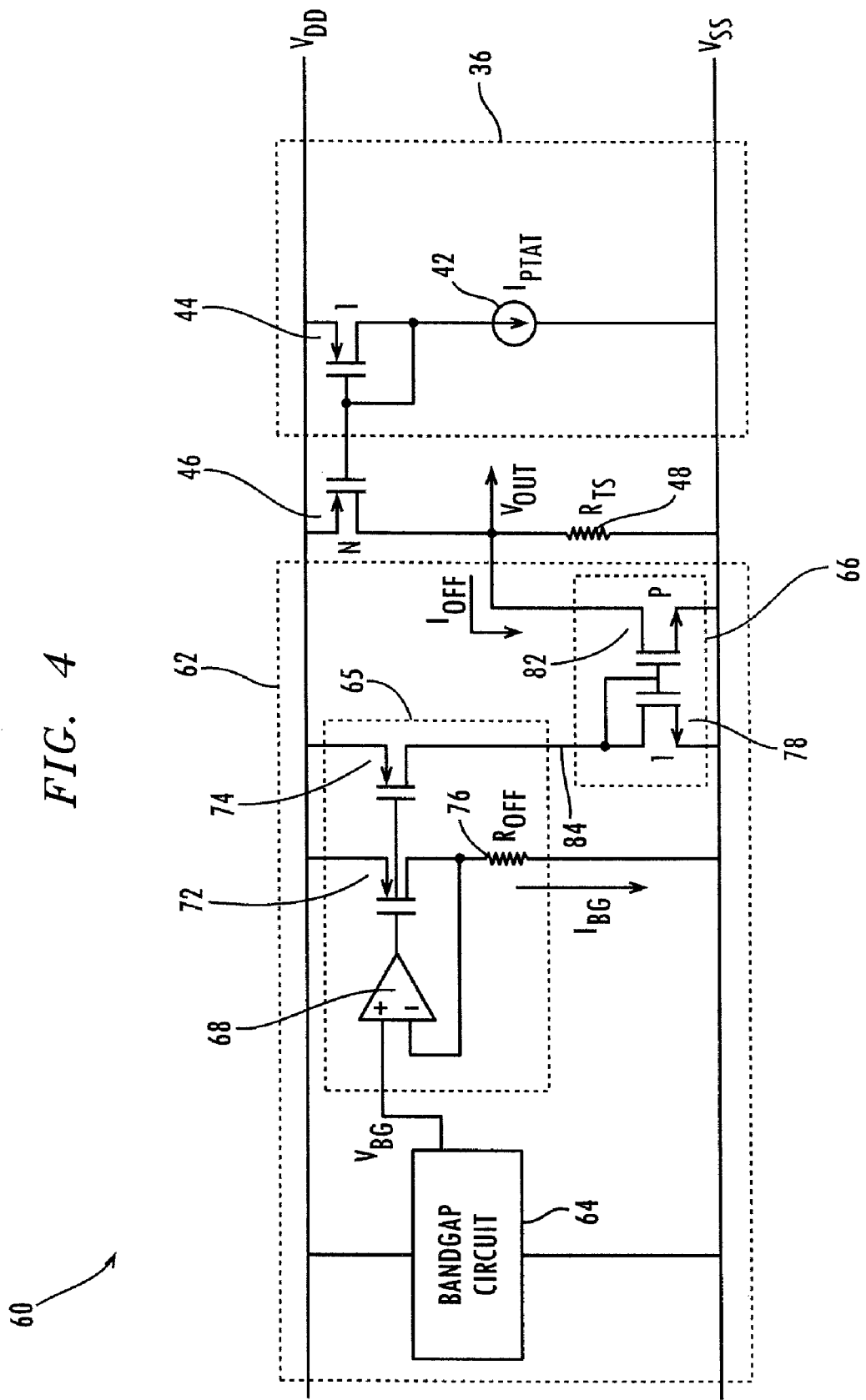
FIG. 4 is a simplified schematic diagram of an IC temperature sensor according to embodiments of the invention.

Referring now to FIG. 4, shown is a simplified schematic diagram of an IC temperature sensor 60 according to embodiments of the invention. The temperature sensor 60 is an integrated circuit (IC) or, along with other circuitry, a portion of an IC. According to embodiments of the invention, the temperature sensor 60 provides an output voltage $V_{OUT}$ that is linearly proportional to the absolute temperature T (e.g., the temperature of the IC die). The temperature sensor 60 also allows for both the gain (volts/° K) and the voltage offset (output voltage at 0° K) to be adjusted independently via circuit parameter ratios in the temperature sensor 60.

As in the conventional temperature sensor described hereinabove, the temperature sensor 60 according to embodiments of the invention includes the equivalent circuit (shown as 36), which includes the ideal current source $I_{PTAT}$ 42 and the unit FET device 44 coupled together as shown between the upper supply voltage $V_{DD}$ 12 and the lower supply voltage $V_{SS}$ 14. The inventive temperature sensor 60 also includes the N-scaled FET device 46 and the temperature sensor resistor $R_{TS}$ 48 coupled in series between the upper supply voltage $V_{DD}$ 12 and the lower supply voltage $V_{SS}$ 14. As with the conventional temperature sensor 10, in the inventive temperature sensor 60, the output voltage $V_{OUT}$ (shown as 61) for the temperature sensor 60 is the voltage generated across the temperature sensor resistor $R_{TS}$ 48.

According to embodiments of the invention, the temperature sensor 60 also includes an offset circuit, shown generally as 62, that diverts or subtracts a portion of current ($I_{OFF}$) from the N-scaled $I_{PTAT}$ current that conventionally would pass through the resistor $R_{TS}$ 48. In this manner, the offset circuit 62 subtracts a fixed voltage offset $V_{OFF}$ from the output voltage $V_{OUT}$ across the resistor $R_{TS}$, thus adjusting or reducing the voltage offset of the temperature sensor 60 as desired. Moreover, according to embodiments of the invention, the offset circuit 62 allows the voltage offset to be adjusted independently by various circuit parameter ratios, as will be discussed in greater detail hereinbelow.

The offset circuit 62 includes a bandgap circuit, shown generally as 64; a voltage to current converter or voltage to current converter arrangement, shown generally as 65; and a current mirror or current mirror arrangement, shown generally as 66. In general, the bandgap circuit 64 and the voltage to current converter 65 function as a current source that establishes a bandgap current $I_{BG}$. The current mirror 66, via its coupling between the N-scaled FET device 46 and the output resistor $R_{TS}$ 48 diverts an offset current ($I_{OFF}$) from the N-scaled $I_{PTAT}$ current that was to pass through the output resistor $R_{TS}$ 48. The diverted current is a scaled version of the bandgap current $I_{BG}$, as will be discussed in greater detail hereinbelow.

The voltage to current converter arrangement 65 includes an op-amp 68, a pair of unit transistor devices (e.g., FETs 72 and 74), and a resistor or offset resistor $R_{OFF}$ 76 coupled together as shown between the upper supply voltage $V_{DD}$ 12 and the lower supply voltage $V_{SS}$ 14. As noted previously herein, the resistor $R_{OFF}$ 76 is the same type of resistor as the resistor used in the circuitry 16 shown in FIG. 1, i.e., the resistor $R_{PTAT}$ 32.

Referring again to FIG. 4, the current mirror 66 includes a unit transistor device (e.g., FET 78) and a P-scaled transistor device (e.g., P-scaled FET 82) coupled together as shown between the voltage to current converter 65, the N-scaled FET 46, and the output resistor $R_{TS}$ 48. As is conventional, the P-scaled FET 82, which has a scaling factor of P, represents P FET devices coupled together in parallel.

In the voltage to current converter 65, the op-amp 68 controls the current through both of the unit FET devices 72, 74 based on the bandgap voltage $V_{BG}$ from the bandgap circuit 64. The current is controlled such that the bandgap voltage $V_{BG}$ is dropped across the resistor $R_{OFF}$, thus deriving a bandgap current $I_{BG}$ through the unit FET device 72 and the offset resistor $R_{OFF}$. The unit FET device 74 mirrors the current $I_{BG}$. The bandgap voltage $V_{BG}$ is a fixed voltage determined by, e.g., the bandgap circuit 64 and/or the overall circuit to which the temperature sensor 60 may belong. In this manner, the bandgap circuit 64 functions as a constant voltage source having the value $V_{BG}$.

The current mirror 66 formed by the unit device 78 and the P-scaled device 82 maintains the value of the current $I_{BG}$ in the current mirror branch (shown generally as 84), except that the current is scaled by a factor of P. Therefore, the P-scaled current $I_{BG}$ is the amount of current diverted from the N-scaled $I_{PTAT}$ current that conventionally was to pass through the output resistor $R_{TS}$. That is, the diverted current, $I_{OFF}=(P)(I_{BG})$.

Therefore, the remaining, non-diverted portion of current that is sourced through the output resistor $R_{TS}$, hereinafter referred to as $I_{OUT}$, is equal to the N-scaled $I_{PTAT}$ current minus the diverted current $I_{OFF}$. That is, $I_{OUT}=(N)(I_{PTAT})-I_{OFF}$. Since $I_{OFF}$ is $I_{BG}$ scaled by a factor of P, substituting for $I_{OFF}$ yields $I_{OUT}=(N)(I_{PTAT})-(P)(I_{BG})$. Because the current $I_{BG}$ is equal to $V_{BG}/R_{OFF}$, substituting for $I_{BG}$ yields $I_{OUT}=(N)(I_{PTAT})-(P)(V_{BG}/R_{OFF})$.

As discussed previously hereinabove, $I_{PTAT}$ is equal to $(\ln(M)V_T)/R_{PTAT}$, where M is the scaling factor of the M-scaled bipolar device 28 (shown in FIG. 1), and $V_T$, which is the thermal voltage of the M-scaled bipolar device, is equal to the constant value kT/q. Substituting for $I_{PTAT}$ yields $I_{OUT}=N(\ln(M)V_T)/R_{PTAT}-(P)(V_{BG}/R_{OFF})$.

The output voltage $V_{OUT}$ 61 of the temperature sensor 60 is equal to $I_{OUT}$ multiplied by the resistor $R_{TS}$. That is, $V_{OUT}=(I_{OUT})(R_{TS})$. Substituting for $I_{OUT}$ yields $V_{OUT}=(R_{TS})[N(\ln(M)V_T)/R_{PTAT}-(P)(V_{BG}/R_{OFF})]$. Expressed another way, $V_{OUT}=(R_{TS}/R_{PTAT})N\ln(M)V_T-P(R_{TS}/R_{OFF})V_{BG}$. Substituting for $V_T$, which is equal to kT/q, $V_{OUT}=(R_{TS}/R_{PTAT})N\ln(M)(kT/q)-P(R_{TS}/R_{OFF})V_{OFF}$. Expressed another way, $V_{OUT}=K_1T-K_2V_{BG}$, where $K_1=(R_{TS}/R_{PTAT})(N\ln(M))(k/q)$ and $K_2=P(R_{TS}/R_{OFF})$.

As shown by the last equation, according to embodiments of the invention, the output voltage $V_{OUT}$ 61 of the temperature sensor 60 still is dependent on temperature T, with $K_1$ being based on a number of constants and device ratios, e.g., scaling factors N and M, and the ratio of values of the output resistor $R_{TS}$ 48 and the resistor $R_{PTAT}$ 32 (shown in FIG. 1). As noted previously herein, since the resistor $R_{TS}$ 48 is the same type of resistor as the resistor $R_{PTAT}$ 32, the output voltage $V_{OUT}$ 61 of the temperature sensor 60 is linearly proportional to temperature T.

Also, as discussed previously, the gain (volts/degrees K) of the temperature sensor 60 is a function of the ratio of the resistor $R_{TS}$ 48 to the bandgap circuit resistor $R_{PTAT}$ 32, and therefore is adjustable. Moreover, according to embodiments of the invention, the output voltage $V_{OUT}$ 61 of the temperature sensor 60 also includes a y-intercept component, $K_2V_{BG}$, which represents the voltage offset $V_{OFF}$. As shown by the equation above, the voltage offset $V_{OFF}$ is a function of the bandgap voltage $V_{BG}$ and $K_2$, with $K_2$ being determined by the scaling factor P and the ratio of values of the output resistor $R_{TS}$ 48 and the offset resistor $R_{OFF}$ 76.

Figure 5:
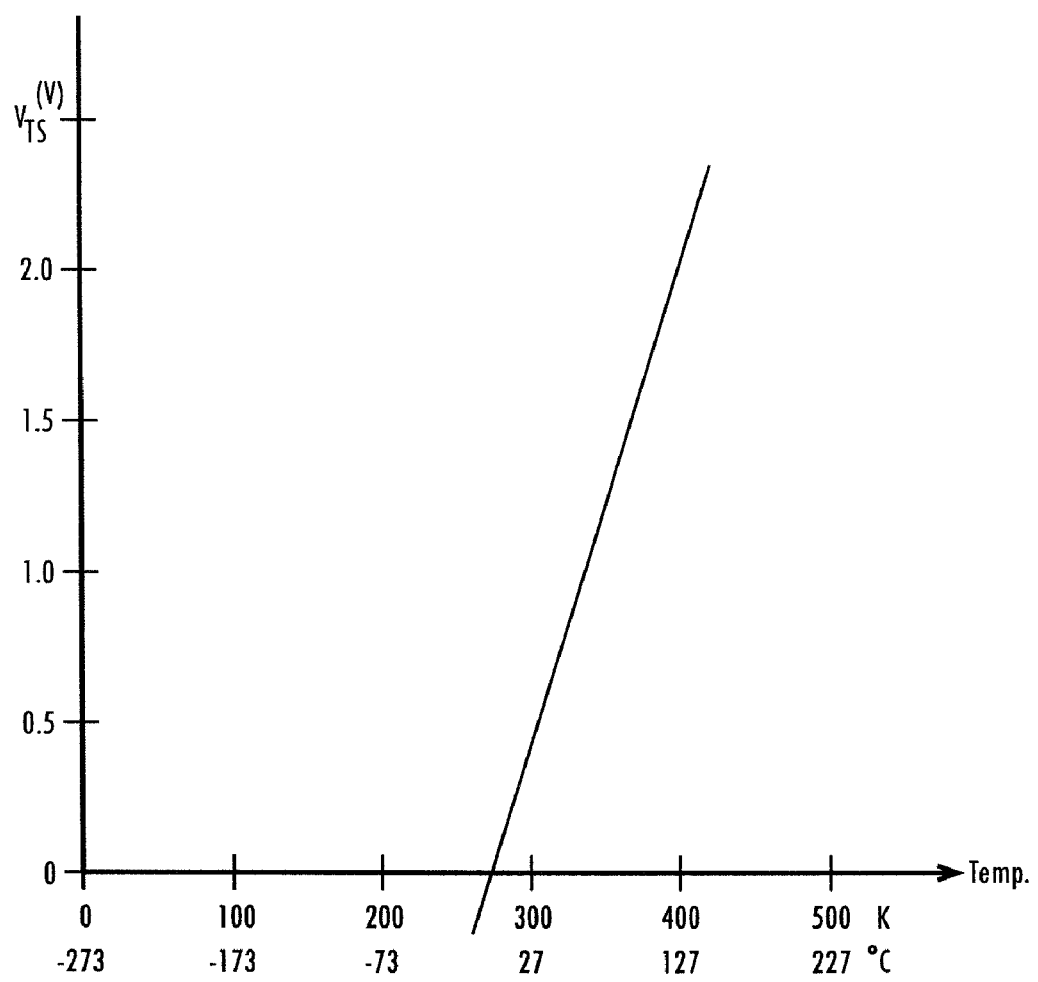
FIG. 5 is a graphical diagram of the output voltage of the inventive temperature sensor shown in FIG. 4, for a single gain value and offset value, as a function of temperature.

Referring now to FIG. 5, shown is graphical diagram of the output voltage $V_{OUT}$, as a function of temperature, of the temperature sensor 60 according to embodiments of the invention. The output voltage $V_{OUT}$ is shown only for one gain value. Compared to the output voltage plots of the conventional temperature sensor 10, shown in FIG. 3, the y-intercept of the output voltage plot in FIG. 5 has been shifted down and the slope of the output voltage plot has been increased. That is, the output voltage plot ($V_{OUT}=K_1T-K_2V_{BG}$) has been adjusted via the voltage offset component ($K_2V_{BG}$) and via the gain component ($K_1$).

According to embodiments of the invention, subtracting a fixed voltage offset from the output voltage of the temperature sensor 60 brings down the y-intercept of its plot. Therefore, since the output voltage no longer has to be 0 volts for a temperature of 0° K, the output swing (i.e., the range of the output voltage) of the temperature sensor 60 can be adjusted as desired for a given temperature range of interest. By adjusting the various circuit parameter ratios, $K_1$ and $K_2$ can be made so that the output voltage plot substantially passes through the range of the supply voltage (e.g., 0 to 2.0 or 2.5 volts) for a given temperature range of interest, e.g., from approximately 27° C. to approximately 127° C. In this manner, the overall resolution of the temperature sensor 60 is improved.

According to embodiments of the invention, the voltage offset component ($K_2V_{BG}$) of the output voltage of the inventive temperature sensor 60 allows the entire plot to be shifted downward. Such shifting allows the lower limit of the useful portion of the output voltage plot to be closer to the lower limit of the range of the temperature of interest. That is, as the output voltage plot is shifted downward, the value of the plot is made to be near 0 volts for temperatures near 27° C. Also, the gain component ($K_1$) of the output voltage of the inventive temperature sensor 60 allows the upper limit of the useful portion of the output voltage plot to be closer to the upper limit of the range of the temperature of interest. That is, by increasing the slope of the output voltage plot, the value of the plot is made to be near 2.0 or 2.5 volts for temperatures near 27° C. In this manner, the output voltage plot falls almost entirely within the useful voltage range of the temperature sensor 60, e.g., 0 to 2.0-2.5 volts, for the temperature range of interest, e.g., 27° C. to 127° C.

For example, as shown in FIG. 3, between a temperature range of 27° C. and 127° C., the output swing of the conventional temperature sensor 10 previously described is from, e.g., 1.50 volts to 2.00 volts (0.50 volt swing) for the first gain value plot 52, and from 0.75 volts to 1.00 volts (0.25 volt swing) for the second gain value plot 54. However, by comparison, according to embodiments of the invention, across the same temperature range, the output swing of the inventive temperature sensor 60 can be shifted down approximately 0.75 volts or approximately 1.50 volts (depending on which gain plot is used) so that the value of the output voltage plot is approximately 0 volts at a temperature of approximately 27° C. As shown in FIG. 5, such a voltage offset shift makes the voltage swing from approximately 0.250 volts to approximately 2.0 volts across the temperature range of 27° C. to 127° C. Such an output swing provides a more robust response by the inventive temperature sensor 60 compared to the response of the conventional temperature sensor 10.

As discussed hereinabove, the gain of the inventive temperature sensor 60 is a function of the ratio of the output resistor $R_{TS}$ 48 to the bandgap circuit resistor $R_{PTAT}$ 32. Also, the voltage offset $V_{OFF}$ is a function of the bandgap voltage $V_{BG}$ and $K_2$, which is based on the scaling factor P and the ratio of values of the output resistor $R_{TS}$ 48 and the offset resistor $R_{OFF}$ 76. Because the bandgap voltage $V_{BG}$ is a constant value and may be set by the overall circuit design, the design parameters for the inventive temperature sensor 60 include the resistor values for resistors $R_{TS}$ 48, $R_{PTAT}$ 32, and $R_{OFF}$ 76, and the transistor device scaling factors N and M.

Referring now to FIG. 6, shown is a method 100 for sensing the temperature of an integrated circuit according to embodiments of the invention. The method 100 includes a step 102 of generating a proportional to absolute temperature current ($I_{PTAT}$) that is proportional to absolute temperature (T), e.g., using the current source $I_{PTAT}$ 42, as described hereinabove. The method 100 also includes a step 104 of scaling the PTAT current $I_{PTAT}$ by a factor of N, e.g., using the N-scaled FET device 46, as described hereinabove.

The method 100 also includes the step 106 of diverting an offset portion of current ($I_{OFF}$) from the N-scaled PTAT current, e.g., using the offset circuit 62, as described hereinabove. As described hereinabove, the diverting step 106 subtracts a fixed voltage offset $V_{OFF}$ from the output voltage $V_{OUT}$ across the resistor $R_{TS}$, thus adjusting or reducing the voltage offset of the temperature sensor 60 as desired.

The method 100 also includes the step 108 of sourcing the remaining, non-diverted portion of the N-scaled PTAT current through the output resistor $R_{TS}$, e.g., as described hereinabove. The method 100 also includes a step 110 of generating the output voltage $V_{TS}$, e.g., by the flow of the temperature sensor current $I_{TS}$ through the temperature sensor resistor $R_{TS}$. As discussed hereinabove, the output voltage $V_{TS}$ is a function of the absolute temperature T and a function of the bandgap voltage $V_{BG}$.

The method 100 also includes the step 112 of offsetting the voltage across the temperature sensor resistor $R_{TS}$ by a voltage offset $V_{OFF}$. As discussed hereinabove, the voltage offset $V_{OFF}$ is the bandgap voltage $V_{BG}$ multiplied by a scaling factor P and multiplied by the ratio of the temperature sensor resistor $R_{TS}$ 48 to the offset resistor $R_{OFF}$ 76.

The method 100 also includes the step 114 of adjusting the offset of the temperature sensor output voltage by the voltage offset $V_{OFF}$, e.g., by adjusting the ratio of the temperature sensor resistor $R_{TS}$ 48 to the offset resistor $R_{OFF}$ 76. As discussed hereinabove, because the resistor $R_{TS}$ 48 is the same type of resistor as the resistor $R_{PTAT}$ 32, the output voltage $V_{OUT}$ 61 of the temperature sensor 60 is linearly proportional to temperature T. Also, the method 100 includes the step 116 of adjusting the gain of the temperature sensor output voltage, e.g., by adjusting the ratio of the temperature sensor resistor $R_{TS}$ 48 to the current source resistor $R_{PTAT}$ 32.

It will be apparent to those skilled in the art that many changes and substitutions can be made to the embodiments of the invention herein described without departing from the spirit and scope of the invention as defined by the appended claims and their full scope of equivalents. For example, although the circuit components are described hereinabove as an integrated circuit or part of an integrated circuit, the various circuit components alternatively can be discrete components arranged and coupled together to form the various circuits shown and described.

The invention claimed is:

1. A method for sensing the temperature of an integrated circuit, comprising the steps of:

generating a proportional to absolute temperature (PTAT) current $I_{PTAT}$ that is proportional to absolute temperature (T);

scaling the PTAT current $I_{PTAT}$ by a factor of N to generate an N-scaled PTAT current;

diverting with an offset circuit an offset portion of current $I_{OFF}$ from the N-scaled PTAT current, the offset circuit having a bandgap voltage $V_{BG}$ across an offset resistor $R_{OFF}$;

sourcing the remaining, non-diverted portion of the N-scaled PTAT current through a temperature sensor resistor $R_{TS}$ as a temperature sensor current $I_{TS}$;

generating an output voltage $V_{TS}$ by the flow of the temperature sensor current $I_{TS}$ through the temperature sensor resistor $R_{TS}$, the output voltage $V_{TS}$ being a function of the absolute temperature T and a function of the bandgap voltage $V_{BG}$; and offsetting the voltage across the temperature sensor resistor $R_{TS}$ by a voltage offset $V_{OFF}$, wherein the voltage offset $V_{OFF}$ is the bandgap voltage $V_{BG}$ multiplied by a scaling factor P and multiplied by the ratio of the temperature sensor resistor $R_{TS}$ to an offset resistor $R_{OFF}$.

2. The method as recited in claim 1, wherein the voltage offset $V_{OFF}$ is adjustable based on the ratio of the temperature sensor resistor $R_{TS}$ to the offset resistor $R_{OFF}$.

3. The method as recited in claim 1, wherein the PTAT current $I_{PTAT}$ generating step generates the PTAT current $I_{PTAT}$ using a current source that includes a current source resistor $R_{PTAT}$, and wherein the output voltage $V_{TS}$ has a gain that is adjustable based on the ratio of the temperature sensor resistor $R_{TS}$ to the current source resistor $R_{PTAT}$.

4. The method as recited in claim 1, wherein the diverting step includes the steps of:

generating a bandgap current $I_{BG}$ based on the bandgap voltage $V_{BG}$ and the offset resistor $R_{OFF}$, and scaling the bandgap current $I_{BG}$ by a factor of P to generate a P-scaled bandgap current, wherein the P-scaled bandgap current determines the offset current $I_{OFF}$ that is diverted from the N-scaled PTAT current.

5. The method as recited in claim 4, wherein the step of generating the bandgap current $I_{BG}$ generates the bandgap current $I_{BG}$ using a voltage to current converter, and wherein the voltage to current converter comprises:

an op-amp having an inverting input, a non-inverting input, and an output, a first field effect transistor (FET) having a gate coupled to the output of the op-amp, a source coupled to an upper supply voltage $V_{DD}$, and a drain coupled to the inverting input of the op-amp, a second FET having a gate coupled to the output of the op-amp and the gate of the first FET, a source coupled to the upper supply voltage $V_{DD}$, and a drain coupled to the second current mirror, and a resistor coupled between the lower supply voltage $V_{SS}$ and the drain of the first FET and the inverting input of the op-amp, wherein the voltage potential at the non-inverting input of the op-amp is the bandgap voltage $V_{BG}$.

6. The method as recited in claim 1, wherein the generating step generates the PTAT current $I_{PTAT}$ using a first current source that includes a current source resistor $R_{PTAT}$, and wherein the offset circuit includes:

a bandgap circuit for generating the bandgap voltage $V_{BG}$, a voltage to current converter, coupled to the bandgap circuit, for generating a bandgap current $I_{BG}$ based on the bandgap voltage $V_{BG}$ and the offset resistor $R_{OFF}$, and a second current mirror coupled between the voltage to current converter, the first current mirror and the temperature sensor resistor $R_{TS}$, the second current mirror having the scaling factor P for scaling the bandgap current $I_{BG}$ to determine the voltage $V_{OFF}$.

7. The method as recited in claim 1, wherein the bandgap voltage $V_{BG}$ is based on the voltage potential of the integrated circuit.

8. A method for detecting the temperature of one or more integrated circuits chips on an integrated circuit die, the method comprising the steps of:

generating with a current source a PTAT current $I_{PTAT}$ that is proportional to absolute temperature T, the current source including a resistor $R_{PTAT}$;

scaling with a current mirror having a scaling factor of N the PTAT current $I_{PTAT}$ to generate an N-scaled PTAT current;

diverting with an offset circuit an offset portion of current $I_{OFF}$ from the N-scaled PTAT current generated by the current mirror, the offset circuit having a bandgap voltage $V_{BG}$ across an offset resistor $R_{OFF}$;

sourcing the remaining, non-diverted portion of the N-scaled PTAT current through a temperature sensor resistor $R_{TS}$ as a temperature sensor current $I_{OUT}$, generating an output voltage $V_{TS}$ by the flow of the temperature sensor current $I_{TS}$ through the temperature sensor resistor $R_{TS}$, the output voltage $V_{TS}$ being a function of the absolute temperature T and a function of the bandgap voltage $V_{BG}$, wherein the temperature sensor has a gain that is based on the ratio of the temperature sensor resistor $R_{TS}$ to the current source resistor $R_{PTAT}$, and wherein the temperature sensor has a voltage offset that is based on the ratio of the temperature sensor resistor $R_{TS}$ to the offset resistor $R_{OFF}$.

9. The method as recited in claim 8, wherein the current mirror further comprises a first current mirror, wherein the offset circuit further comprises a bandgap circuit and a second current mirror, and wherein the diverting step further comprises the steps of:

generating, with a bandgap circuit and a voltage to current converter, a bandgap current $I_{BG}$ based on the bandgap voltage $V_{BG}$ and the offset resistor $R_{OFF}$, and scaling with a second current mirror having a scaling factor of P the bandgap current $I_{BG}$ by a factor of P, wherein the P-scaled bandgap current determines the offset current $I_{OFF}$ that is diverted from the N-scaled PTAT current.

10. The method as recited in claim 9, wherein the current mirror includes a unit transistor device and a P-scaled transistor device, and wherein the scaling factor P is based on the size of the P-scaled transistor device.

11. The method as recited in claim 8, wherein the bandgap voltage $V_{BG}$ is based on the voltage potential of the integrated circuit.

12. The method as recited in claim 8, wherein the offset circuit further comprises:

a first circuit portion that generates a bandgap current $I_{BG}$ based on the bandgap voltage $V_{BG}$ and the offset resistor $R_{OFF}$, and a second circuit portion, coupled to the first circuit portion, that scales up the bandgap current $I_{BG}$ to determine the offset current $I_{OFF}$ diverted from the N-scaled PTAT current.

13. The method as recited in claim 8, wherein the voltage to current converter further comprises:

an op-amp having an inverting input, a non-inverting input, and an output, a first field effect transistor (FET) having a gate coupled to the output of the op-amp, a source coupled to the upper supply voltage $V_{DD}$, and a drain coupled to the inverting input of the op-amp, a second FET having a gate coupled to the output of the op-amp and the gate of the first FET, a source coupled to the upper supply voltage $V_{DD}$, and a drain coupled to the second current mirror, and a resistor coupled between the lower supply voltage $V_{SS}$ and the drain of the first FET and the inverting input of the op-amp, wherein the voltage potential at the non-inverting input of the op-amp is the bandgap voltage $V_{BG}$.

* * * * *